US007713491B2

(12) United States Patent
Claude

(10) Patent No.: US 7,713,491 B2
(45) Date of Patent: May 11, 2010

(54) DUAL RISER VENTING METHOD AND SYSTEM

(75) Inventor: Alan M. Claude, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 586 days.

(21) Appl. No.: 11/634,638

(22) Filed: Dec. 6, 2006

(65) Prior Publication Data

US 2008/0134892 A1 Jun. 12, 2008

(51) Int. Cl.
*F27B 15/08* (2006.01)
*B01D 45/12* (2006.01)

(52) U.S. Cl. ....................... 422/147; 422/139; 422/144; 55/346; 95/271; 208/78

(58) Field of Classification Search ................ 422/139, 422/144, 147; 55/346; 95/271; 208/78, 208/80
See application file for complete search history.

(56) References Cited

U.S. PATENT DOCUMENTS 3,802,570 A 4/1974 Dehne
4,455,220 A 6/1984 Parker et al.
4,502,947 A 3/1985 Haddad
4,692,311 A 9/1987 Parker
4,717,466 A * 1/1988 Herbst et al. ................ 208/113
4,741,883 A 5/1988 Haddad
4,778,488 A 10/1988 Koers
5,364,515 A 11/1994 Lomas
5,393,415 A 2/1995 Sechrist
5,569,435 A 10/1996 Fusco
5,869,008 A 2/1999 Dewitz
2006/0049082 A1* 3/2006 Niccum et al. .............. 208/113

* cited by examiner

*Primary Examiner*—Walter D Griffin
*Assistant Examiner*—Lessanework Seifu
(74) *Attorney, Agent, or Firm*—KBR IP Legal

(57) ABSTRACT

Two or more cyclone systems can be contained in a single vessel. Each cyclone system can be in fluid communication with an inlet stream and a fluid discharge line. First cyclone system can include a vent open to the cyclone containing vessel. Second cyclone system can be sealed to restrict fluid entry from and/or exit into vessel, which can inhibit product vapors from exiting the vent of one cyclone system into the vessel and flowing into the vent of the other cyclone system.

19 Claims, 4 Drawing Sheets

DUAL RISER VENTING METHOD AND SYSTEM

CROSS REFERENCE TO RELATED APPLICATIONS

Field

The embodiments relate generally to venting methods and systems for two or more cyclone systems contained within a single vessel, and more particularly, to particle removal in a dual riser fluid catalytic cracking (FCC) unit.

BACKGROUND

FCC processes, which employ catalyst fluidization and hydrocarbon atomization for conversion reactions, can utilize rapid mixing and separation of fluid and solid phases to maintain control over product yields. The cracking portion of the FCC process can occur in a riser(s) with the separation portion occurring, at least partially, by cyclonic separation.

Cyclonic separation involves separating a mixture of two or more phases, for example, suspensions of particulates in a carrier fluid, under a centrifugal force generated by centripetal motion. A cyclone separator, or cyclone, is a mechanical device to perform centrifugal separation of flowing mixed phases. Cyclone separation can be utilized in FCC technology where hydrocarbon vapors and particulate catalysts come into intimate contact. Achieving high productivity from FCC systems can include regulating the contact times between the catalyst and the hydrocarbons by quickly separating catalyst from the riser effluent after the desired amount of contact time in the riser(s). An FCC unit can include multiple risers and a catalyst separation unit thereof can include a cyclone system connected to each riser. The cyclone system can be independent. For closed cyclone systems, a vent can allow catalyst stripping vapors to exit with the riser product vapors.

If multiple vented independent cyclone systems are utilized within a single disengager vessel, small imbalances in flow can produce cross-talk in which riser product vapors exit the vent of one of the cyclone systems and flow into the vent of another cyclone system. This can reduce the yield advantages for closed cyclones because a significant amount of the riser product vapors can be exposed to high temperatures within the disengager vessel for prolonged periods of time, resulting in thermal cracking and the associated loss in gasoline yield and increase in dry gas yield.

BRIEF DESCRIPTION OF THE DRAWINGS

The detailed description will be better understood in conjunction with the accompanying drawings as follows.

Figure 1:
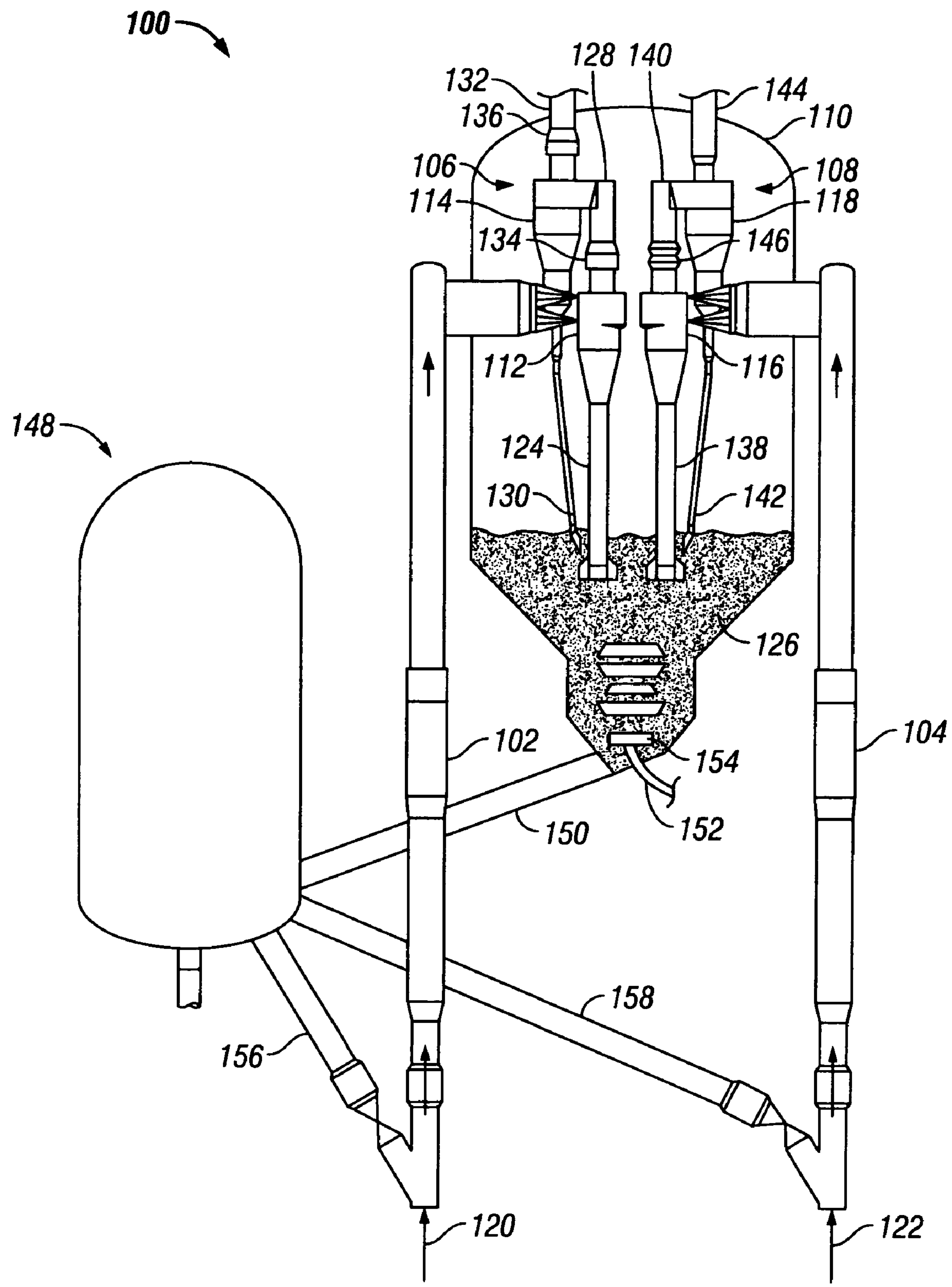
FIG. 1 schematically illustrates a particle separation unit of a dual riser fluid catalytic cracking (FCC) unit with dual cyclone systems, according to one embodiment.

The embodiments are detailed below with reference to the listed FIGURES.

DETAILED DESCRIPTION OF THE EMBODIMENTS

Before explaining the embodiments in detail, it is to be understood that the embodiments are not limited to the particular embodiments and that they can be practiced or carried out in various ways.

The embodiments relate to systems and methods for venting vapor from a vessel containing two or more independent cyclone systems, while simultaneously avoiding "cross-talk" between the independent cyclone systems. Generally, cross-talk refers to vapor flow from one cyclone system through the containment vessel and into the vent of another cyclone system. Avoiding cross-talk can be desirable, for example, if a long residence time in the vessel causes product degradation and/or if a fluid within one of the cyclone systems causes undesirable contamination of a fluid within another of the cyclone systems. Cross-talk between two or more vented cyclone systems can occur when the fluid flow in the cyclone systems is not precisely controlled to prevent a pressure differential relative to each cyclone system. The fluid can reverse flow out of a vent of the higher pressure cyclone system, through the containing vessel, and into the vent of the lower pressure cyclone system.

Fluid catalytic cracking (FCC) is one example of an application that can benefit from the embodied principles and, for the purpose of illustration and not limitation, provides a context in which to explain the advantages. An FCC unit can utilize two risers to efficiently process the feed. Further, some FCC units can have a different feed in each of the risers. Catalyst can be rapidly separated from the process vapor to control reactions and maximize the yield of valuable products. To prevent undesirable thermal cracking reactions in the cyclone containment vessel, (for example, a disengager vessel), the vapor discharge outlet from a primary cyclone attached to a riser can be routed directly to a second stage cyclone. The vapor discharge outlet from a second stage cyclone can be routed directly to a disengager product vapor line, e.g., a fluid discharge from the vessel.

Catalyst removed by a cyclone can be stripped with a fluid, such as steam, to remove entrained hydrocarbons. This stripping process can occur within a disengager vessel. The stripper vapors and/or stripped hydrocarbon vapor can be contaminated with catalyst which can be removed prior to joining the product vapors within the disengager product vapor line, e.g., the fluid discharge from the vessel. One solution is to provide a vent in the cyclone ductwork to allow stripper vapors and/or stripped hydrocarbon vapor to mix with the main vapor product flow upstream of a cyclone.

However, with a dual riser system and independent sets of cyclones associated with each riser, providing vents for both independent cyclone systems produces the possibility that vapor from one cyclone system can reverse flow through its vent and enter the disengager vessel where the long residence time can produce thermal cracking reactions which may reduce the yield of valuable liquid hydrocarbon products and may simultaneously increase the yield of less valuable products such as coke and dry gas. By installing a vent in only one of the independent cyclone systems and sealing the other cyclone systems, the risers can be operated independently without any undesirable cross-talk and/or reverse flow.

A cyclone system can include one or more cyclones, for example, primary and secondary cyclones or stages of cyclones connected in series by conduit and/or a plenum to gather from or distribute to a plurality of cyclones in a stage. A primary and secondary cyclone can be connected such that a vapor discharge outlet from the primary cyclone is ducted directly to an inlet of the secondary cyclone to prevent vapor entry and/or exit into a disengager vessel.

Cyclone systems generally refer to cyclone system not in direct communication with another cyclone system within the same vessel. The vapor and/or solids streams from one cyclone system are not mixed with vapor and/or solids streams from another cyclone system. Each cyclone system can be composed of one or more cyclones per stage, and one or more cyclone stages of the primary cyclone can perform the initial solids separation. A cyclone system can include a vent for vapors generated within the vessel. Common locations for the vent can include: at the inlet to the primary or first stage of cyclones, around the outlet conduit for the primary or first stage of cyclones, in the conduit between the primary or first stage of cyclones and the secondary or secondary stage of cyclones, in the body of either the primary or secondary stage of cyclones, or a design dependent location. In one embodiment, a vent is not included for a cyclone system seeking to avoid cross-talk.

A particle separation unit can include a vessel, a first cyclone system disposed within the vessel, a vent formed in the first cyclone system for vapor entry from the vessel, and a second cyclone system disposed within the vessel. The vessel can include vapor therein. The second cyclone system can be sealed to vapor entry from the vessel and/or sealed from discharging any vapor therein into the vessel. The first and second cyclone systems can be independent. The particle separation unit can have a plurality of the second cyclone systems disposed within the vessel and sealed to restrict vapor entry from the vessel. The vessel can be a disengager vessel. The vapor within the vessel can be generated by a stripping process therein. The vent can include an opening disposed in the first cyclone system, for example, an outlet conduit thereof. A cyclone system can include a fluid supply extending into the vessel and/or a fluid discharge exiting from the vessel. The fluid supply and/or fluid discharge can be sealed from communication with the vessel. The system described can be closed to the extent that the vapor is routed directly to the fluid discharge rather than being allowed to enter the disengager dilute phase prior to being routed to the discharge.

In one embodiment, a catalyst separation unit for a dual riser fluid catalytic cracking (FCC) unit can include a first cyclone system in a disengager vessel comprising a first set of one or more cyclones in fluid communication between a first riser and a first fluid discharge from the disengager vessel, a vent formed in the first cyclone system for vapor to enter from the disengager vessel and exit via the first fluid discharge, and a second cyclone system in the disengager vessel comprising a second set of one or more cyclones in fluid communication between a second riser and a second fluid discharge from the disengager vessel. The second cyclone system can be sealed to vapor entry from the disengager vessel and/or sealed to vapor exit into the disengager vessel. The vent can be an opening disposed in a cyclone outlet conduit. The opening can be an open hood vent. The second cyclone system can include a sealed expansion joint.

In one embodiment, the first cyclone system can include both primary and secondary cyclones. The vent can be disposed in a conduit in communication between the primary and secondary cyclones or at any one of the locations mentioned previously, or at any other location that allows vapor from the disengager vessel to enter the cyclone system and exit the disengager vessel. The second cyclone system can include primary and secondary cyclones. The second cyclone system can include a sealed expansion joint disposed in a conduit in communication between the primary and secondary cyclones. Regardless of the presence or location of a sealed expansion joint, the second cyclone system can be sealed to restrict vapor within the disengager vessel from entering the cyclone system and exiting the disengager vessel.

In one embodiment, the first set of one or more cyclones can include a primary cyclone. The primary cyclone can include a cyclone vessel, a cylindrical surface centrally mounted in the primary cyclone to separate particles from a first riser effluent and form a vapor vortex of reduced solids content, a sealed vapor outlet from the primary cyclone in communication with the vortex and the first fluid discharge, and a solids discharge outlet from a lower end of the primary cyclone. The vent can include a plurality of openings in a wall of the lower end of the primary cyclone for the entry of vapor from the disengager vessel.

In one embodiment, a particle separation unit of a dual riser fluid catalytic cracking (FCC) unit can include a disengager vessel comprising a dense particle bed, a source of stripping fluid into the dense bed, and a dilute vapor phase above the dense bed, a first cyclone system comprising a closed primary cyclone in fluid communication with a first riser to separate particles from a first riser effluent and discharge the separated particles to the dense bed, an outlet conduit from the primary cyclone to a closed secondary cyclone, and a first fluid discharge from the secondary cyclone through a wall of the disengager vessel, a vent formed in the outlet conduit of the first cyclone system between the primary and secondary cyclones for vapor to enter the secondary cyclone from the dilute phase and exit via the first fluid discharge, and a second cyclone system comprising a closed primary cyclone in fluid communication with a second riser to separate particles from a second riser effluent and discharge the separated particles to the dense bed, an outlet conduit from the primary cyclone to a closed secondary cyclone, and a second fluid discharge from the secondary cyclone through a wall of the disengager vessel. The second cyclone system can be sealed to vapor entry from the dilute phase and/or discharging a fluid into the disengager vessel.

In one embodiment, each riser of a dual riser FCC unit can be connected to a cyclone system. A "dual riser" FCC unit can refer to a system having two or more risers with common catalyst disengagement, stripping and/or regeneration. Although three or more risers are theoretically possible in a dual riser FCC system, a two-riser system can have practical advantages as an embodiment of the invention.

Embodied methods of venting vapor from a vessel containing first and second cyclone systems can include forming a vent in the first cyclone system for vapor entry from the vessel, and sealing the second cyclone system from vapor entry from the vessel. The methods can include sealing the second cyclone system from discharging any vapor therein into the vessel. The method can include venting vapor from the vessel through the vent into the first cyclone system. The first cyclone system can include a fluid discharge from the vessel.

Embodied methods of separating solid and vapor from riser effluent in a dual riser fluid catalytic cracking (FCC) unit can include supplying effluent from first and second risers to primary cyclones of respective first and second cyclone systems in a disengager vessel to separate solids from the effluents, discharging vapor from the first and second cyclone systems through respective first and second fluid discharges from the disengager vessel, discharging solids from the primary cyclones of the first and second cyclone systems into a dense bed in the disengager vessel, introducing stripping vapor into the dense bed to strip vapor from the solids into a dilute vapor phase in the disengager vessel, and venting vapor from the dilute vapor phase into the first cyclone system to exit the disengager vessel via the first fluid discharge.

The methods can include sealing the second cyclone system to vapor entry from the dilute vapor phase and/or sealing the second cyclone system from discharging vapor therefrom into the disengager vessel. The venting can be through an opening disposed in an outlet conduit from the primary cyclone in the first cyclone system. The opening can include an open hood vent. The outlet conduit can be in communication between the primary cyclone in the first cyclone system and a secondary cyclone in the first cyclone system. A vent can be disposed at any of the locations mentioned previously or at any location that allows vapors to enter the second cyclone system from the disengager vessel.

With reference to the figures, FIG. 1 schematically illustrates a particle separation unit 100 of a dual riser (102, 104) fluid catalytic cracking (FCC) unit with dual independent cyclone systems (106, 108), according to one embodiment of the invention. First and second cyclone systems (106, 108) are disposed within disengager vessel 110. Disengager vessel 110 can contain a fluid, for example, a stripping fluid such as, but not limited to, steam, and/or a stripped fluid such as but not limited to hydrocarbon vapors. Stripping can occur in disengager vessel 110 in one embodiment, or alternatively separate vessel(s) can be utilized, one for catalyst disengagement from the riser effluent and another for subsequent and/or additional stripping of residual hydrocarbon vapor from the disengaged catalyst.

FIG. 1 examples the first cyclone system 106 including a primary cyclone 112 and secondary cyclone 114. Second cyclone system 108 can also include a primary cyclone 116 and secondary cyclone 118.

First cyclone system 106 is independent from second cyclone system 108. First cyclone system 106, or more specifically, primary cyclone 112, can receive an effluent from first riser 102. Second cyclone system 108, or more specifically, primary cyclone 116, can receive an effluent from second riser 104. Effluent can include a fluid/particulate suspension, for example, a hydrocarbon fluid/catalyst suspension. Feed streams (120, 122) to respective first and second risers 102, 104 can be separate feeds or the same feed.

Effluent from first riser 102 can enter primary cyclone 112 of first cyclone system 106, and particles, e.g., solids, or more specifically, a catalyst, can be separated from the effluent. The separated particles can be discharged from an outlet 124, such as a dipleg, of the primary cyclone 112, which can extend into a dense particle bed 126 or can discharge above the bed. Vapor effluent can then flow through an outlet conduit 128 of the primary cyclone 112 and into a secondary cyclone 114. Separated particles can be discharged from an outlet 130 such as a dipleg of the secondary cyclone 114, which can similarly extend into the dense particle bed 126 or discharge above the bed. Fluid discharge line 132 extends from secondary cyclone 114 and through a wall of the disengager vessel 110. If no secondary cyclone is present, the fluid discharge line can connect directly to the outlet conduit.

In the embodiment depicted in FIG. 1, outlet conduit 128 includes a vent 134 between primary and secondary cyclones 112, 114 of first cyclone system 106. Vent 134 can include an open hood vent, for example. An open hood vent can be defined by two concentric and radially spaced conduits, with one of the adjacent conduit ends, usually the downstream conduit, having a larger diameter than the other to form a gap therebetween. Vent 134 can allow vapor from the disengager vessel 110, for example, a dilute vapor phase above the dense particle bed 126, to enter into the outlet conduit 128. Dilute vapor phase can include a stripping fluid such as, but not limited to, steam. Alternatively or additionally, fluid discharge line 132 can include a vent 136. A vent can be an opening or a plurality of openings in an outlet conduit of a cyclone system. Other vent locations and arrangements are possible and are not limited to those disclosed for the purpose of illustration herein.

Similarly, effluent from second riser 104 can enter primary cyclone 116 of second cyclone system 108, and the particles can be separated from the effluent. The separated particles can be discharged from an outlet 138 such as a dipleg of the primary cyclone 116, which can extend into the dense particle bed 126 or can discharge above the bed. The effluent can then flow through an outlet conduit 140 of the primary cyclone 116 and into any secondary cyclone 118. Separated particles can be discharged from an outlet 142 such as a dipleg of the secondary cyclone 118, which can extend into the dense particle bed 126 or can discharge above the bed. Fluid discharge line 144 can extend from secondary cyclone 118 and through a wall of the disengager vessel 110.

Outlet conduit 140 can include a sealed expansion joint 146 between primary 116 and secondary 118 cyclones of second cyclone system 108. Sealed expansion joint 146 can prevent entry of vapor from the disengager vessel 110 into the outlet conduit 140, for example, from a dilute vapor phase above the dense particle bed 126, and/or exit of vapor effluent from the expansion joint 146 into the disengager vessel 110. Alternatively or additionally, fluid discharge line 144 can include a sealed expansion joint. Outlets (124, 130, 138, 142) can include a dipleg seal which comprises a trickle valve or a level of separated particles in and around a lower end of the dipleg.

The dual riser FCC unit of the embodiment depicted in FIG. 1 can include a catalyst regenerator 148 offset from the disengager vessel 110, and the disengager vessel 110 can be positioned vertically between the first 102 and second 104 riser. Risers (102, 104) can connect to cyclone systems (106, 108) through a sidewall of a disengager vessel 110 or extend through the dense particle bed 126. Catalyst can be supplied from the disengager vessel 110 to the regenerator 148 via transfer line 150. Stripping gas, if employed, can be supplied via stripping fluid conduit 152 connected to a distributor 154 near the bottom of the dense particle bed 126. A blend of effluent lean in suspended solids can be recovered from fluid discharge lines (132, 144). Regenerated catalyst can be recirculated to the first riser 102 via transfer line 156 along with a fresh feed stream 120 and to the second riser 104 via transfer line 158 along with a fresh feed stream 122.

Imbalances in flow between dual risers vented to a disengager vessel can produce cross talk where riser product vapors exit the vent of a cyclone system of one riser and flow into the vent of a cyclone system of the other riser. Because the interior of the disengager vessel 110 vents at vents 134 or 136 into the first cyclone system 106 depicted in FIG. 1, the disengager vessel 110 can be in communication with the first cyclone system 106.

The second cyclone system 108 can be sealed to restrict fluid from entering and/or exiting therefrom, for example, by not providing any vent features. Because cross talk between the dual risers (102, 104) in the disengager vessel 110 can thus be restricted, imbalances in flow of effluent in the risers (102, 104) and/or cyclone systems (106, 108) will not lead to riser effluent exiting the vent of one of the cyclone systems and flowing into the disengager vessel and/or the vent of another cyclone system in the disengager vessel. Flow out of the vent from the cyclone system can otherwise reduce the efficiency of the cyclones in that cyclone system and lead to overreaction and excessive cracking of the riser effluent hydrocarbons, as well as loss of ability to control the contact times between catalyst and the hydrocarbons at elevated temperatures.

In an embodiment with three of more risers disposed in a disengager vessel, one riser and the independent cyclone system associated therewith can be vented to the disengager vessel while the other risers and the independent cyclone systems associated therewith can be sealed from allowing riser effluent to exit into the disengager vessel and/or sealed to entry of a fluid from the disengager vessel. In one embodiment, the cyclone systems which are sealed are those adversely affected by cross-talk. Vents can be installed in two or more cyclone systems if not affected by cross-talk.

Figure 2:
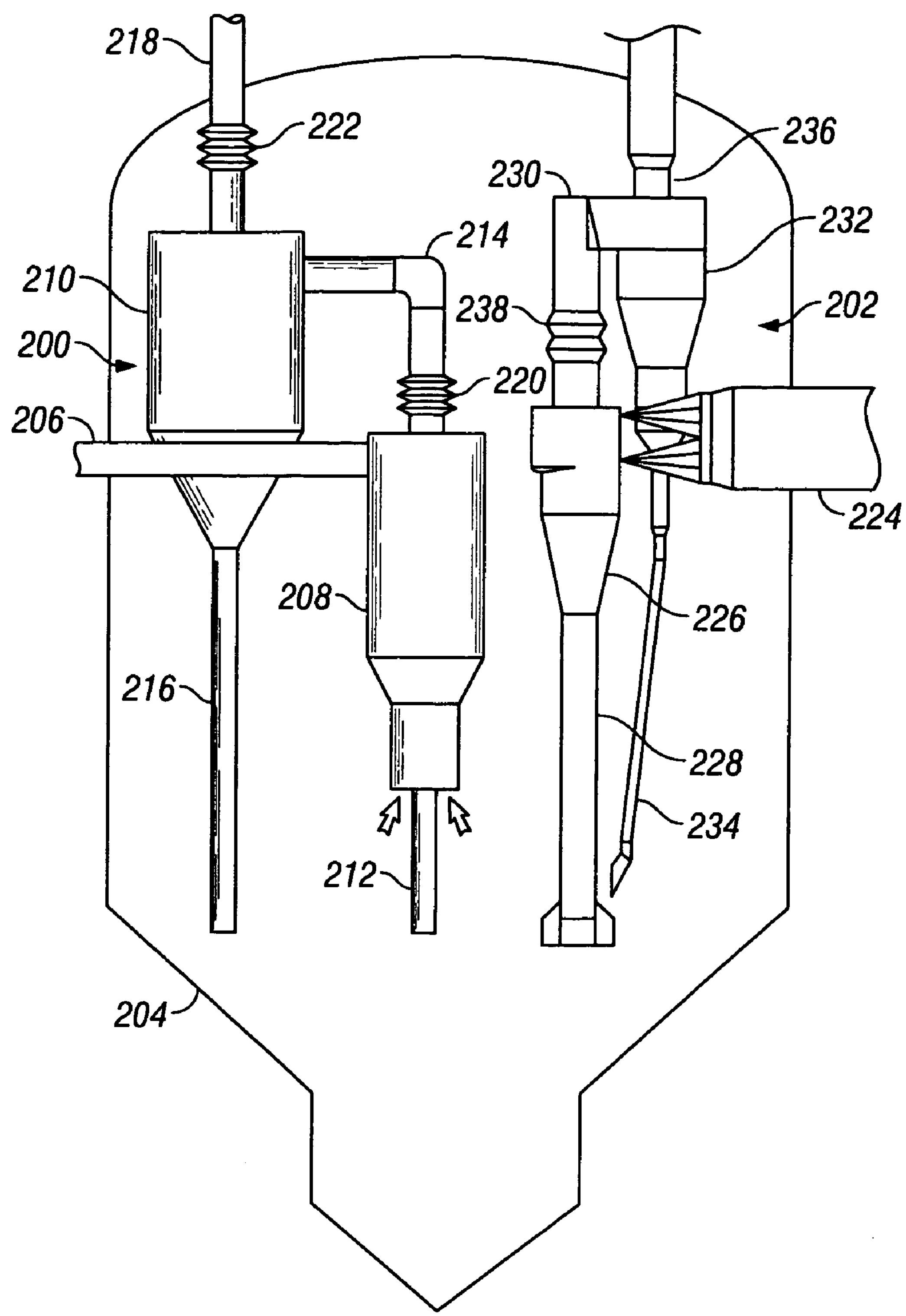
FIG. 2 schematically illustrates dual independent cyclone systems within a disengager vessel, according to one embodiment.

FIG. 2 depicts a schematic illustration of dual independent cyclone systems (200, 202) within a disengager vessel 204, according to one embodiment of the invention. Dual cyclone systems (200, 202) can be equipped and/or operated similarly to the embodiment depicted in FIG. 1.

First cyclone system 200 can include a connection 206 to a first riser, which can supply a riser effluent, a primary cyclone 208, and a secondary cyclone 210. A vent of the first cyclone system 200 can be formed by a plurality of openings in a wall of the lower end of the primary cyclone 208, shown in more detail in FIG. 3, discussed below. Effluent from the connection 206 to a first riser can enter primary cyclone 208.

Particles can be separated from the effluent. The separated particles can be discharged from an outlet 212 of the primary cyclone 208 which can extend into a dense particle bed (not shown) or can discharge above the bed. The effluent, which can include stripping gas vented into the riser effluent, can then flow through an outlet conduit 214 of the primary cyclone 208 and into a secondary cyclone 210. Separated particles can be discharged from an outlet 216 of the secondary cyclone 210 which can extend into a dense particle bed or can discharge above the bed. Fluid discharge line 218 can extend from secondary cyclone 210 and through a wall of the disengager vessel 204. If no secondary cyclone is present, fluid discharge line 218 can connect to outlet conduit 214. Fluid discharge line 218 and/or outlet conduit 214 can include an expansion joint (220, 222), which can be sealed.

Connection 224 to a second riser can supply effluent to primary cyclone 226 of second cyclone system 202, and particles can be separated from the effluent. The separated particles can be discharged from an outlet 228 of the primary cyclone 226 which can extend into a dense particle bed or can discharge above the bed. The effluent can then flow through an outlet conduit 230 of the primary cyclone 226 and into a secondary cyclone 232. Separated particles can be discharged from an outlet 234 of the secondary cyclone 232 which can extend into a dense particle bed or can discharge above the bed. Fluid discharge line 236 can extend from secondary cyclone 232, which can be a closed cyclone, and through a wall of the disengager vessel 204.

Outlet conduit 230 can include a sealed expansion joint 238 between primary 226 and secondary 232 cyclones of second cyclone system 202. Sealed expansion joint 238 can avoid entry of vapor from the disengager vessel 204 into the second cyclone system 202, for example, from a dilute vapor phase above a dense particle bed and/or prevent exit of vapor from the expansion joint 238 into the disengager vessel 204 to the extent that cyclone performance would be compromised. Alternatively or additionally, fluid discharge line 236 can include a sealed expansion joint.

Since the first cyclone system 200 depicted in FIG. 2 is vented to the interior of the disengager vessel 204, the disengager vessel 204 can be in communication with the first cyclone system 200. The second cyclone system 202 can be sealed from allowing any fluid to enter from or exit into the disengager vessel 204, for example, by not providing a vent. Because cross talk between the independent cyclone systems 200, 202 of the dual risers in the disengager vessel 204 can thus be restricted, imbalances in flow of effluent in the risers and/or cyclone systems (200, 202) will not lead to riser effluent exiting the vent of one of the cyclone systems and flowing into the disengager vessel and/or the vent of another cyclone system in the disengager vessel.

Figure 3:
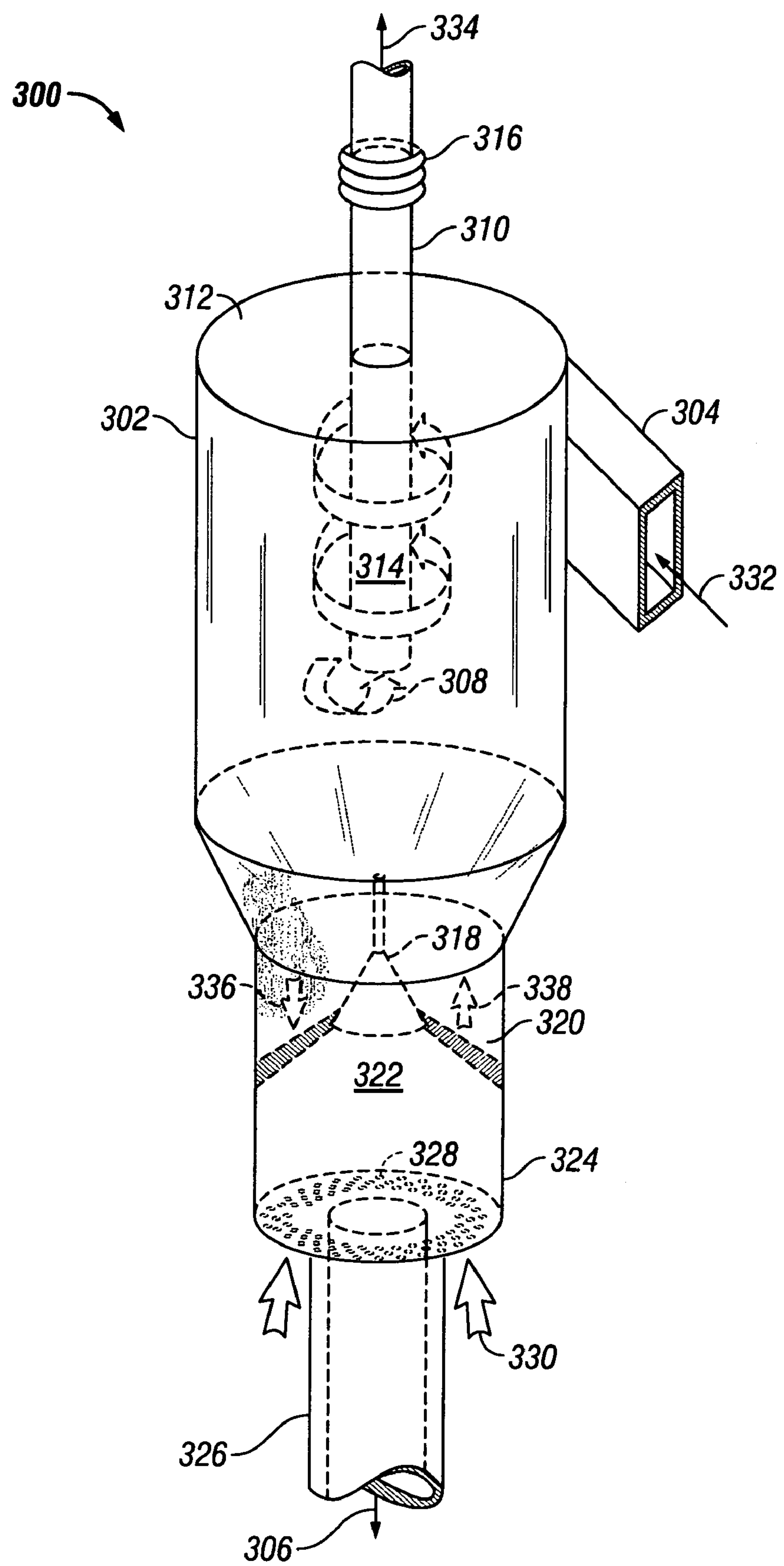
FIG. 3 schematically illustrates an embodiment of the primary cyclone of one of the cyclone systems exampled in FIG. 2.

FIG. 3 depicts a schematic illustration of the primary cyclone of one of the independent cyclone systems of FIG. 2. Primary cyclone 300 can be utilized, for example, as primary cyclone 208 of first cyclone system 200 of the embodiment in FIG. 2. One example of cyclone 300 can be found in U.S. Pat. App. Pub. No. 2006-0049082A1 entitled Self-Stripping FCC Riser Cyclone, herein incorporated by reference for all jurisdictions where permitted. Briefly, primary cyclone 300 includes a cyclone vessel 302, tangential inlet 304 for connection to a riser, and an inner cylindrical surface to separate catalyst solids 306 and form a vapor vortex 308 of reduced solids content. A sealed vapor outlet 310 at the upper end 312 of the cyclone vessel 302 can communicate with the vortex 308 via a vortex tube 314. In high-temperature applications such as fluid catalytic cracking, the sealed vapor outlet 310 can include a sealed expansion joint 316 to absorb structural strains imposed by thermal expansion of components and piping.

A stabilizer 318 below the vortex 308 can be used to form an annular passage 320 between the stabilizer 318 and an interior surface of the cyclone vessel 302. A stripping zone 322 below the stabilizer 318 in the lower end 324 of the cyclone vessel 302 can be in communication with a solids discharge dipleg 326. A plurality of openings 328 can be provided in a perforated wall of the stripping zone 322 for the entry of stripping gas 330 from a disengager vessel and to function as the vent from the disengager vessel to the cyclone system. A lower portion of the stripping zone 322 can comprise a settling bed (not shown) of the catalyst solids 306 into the solids discharge outlet (e.g., dipleg) 326.

In the operation of the self-stripping cyclone 300, the riser effluent 332 (e.g., a fluid/particulate suspension) enters the cyclone vessel 302 tangentially and swirls circumferentially against the cylindrical surface of the vessel, forming the vortex 308. Suspended particulates 306 can be immediately driven outward towards the wall by centrifugal force as the gas phase of decreasing particulate loading forms the vortex 308. From the vortex 308, the solids-lean vapor 334 can exit via the vortex tube 314 to the sealed vapor outlet 310, which can connect to a secondary cyclone (e.g., cyclone 210 in the embodiment of FIG. 2) and/or a fluid discharge line (e.g., line 218 in the embodiment of FIG. 2).

Disentrained particulates 306 can rapidly concentrate at the vessel wall and pass downward as indicated by flow arrow 336 through the annular passage 320 and stripping zone 322 and into the dipleg 326. Due to a differential pressure between the exterior and the interior of the cyclone vessel 302, stripping gas 330 can enter the stripping zone 322 through the openings 328 in the wall and pass upwardly as indicated by flow arrow 338 through the annular passage 320 into the vortex 308. The process vapor can be quickly diffused away from the particulates 306 into the stripping gas 330 in the stripping zone 322 and/or annular passage 320. The stripping gas 330 can be air, steam, ammonia, flue gas, or a mixture thereof. In applications other than FCC systems, the stripping fluid can desirably be chosen to be compatible with the particulates to be stripped and the process fluids to be removed from the particulates. Stripping gas can be disposed within a disengager vessel.

Figure 4:
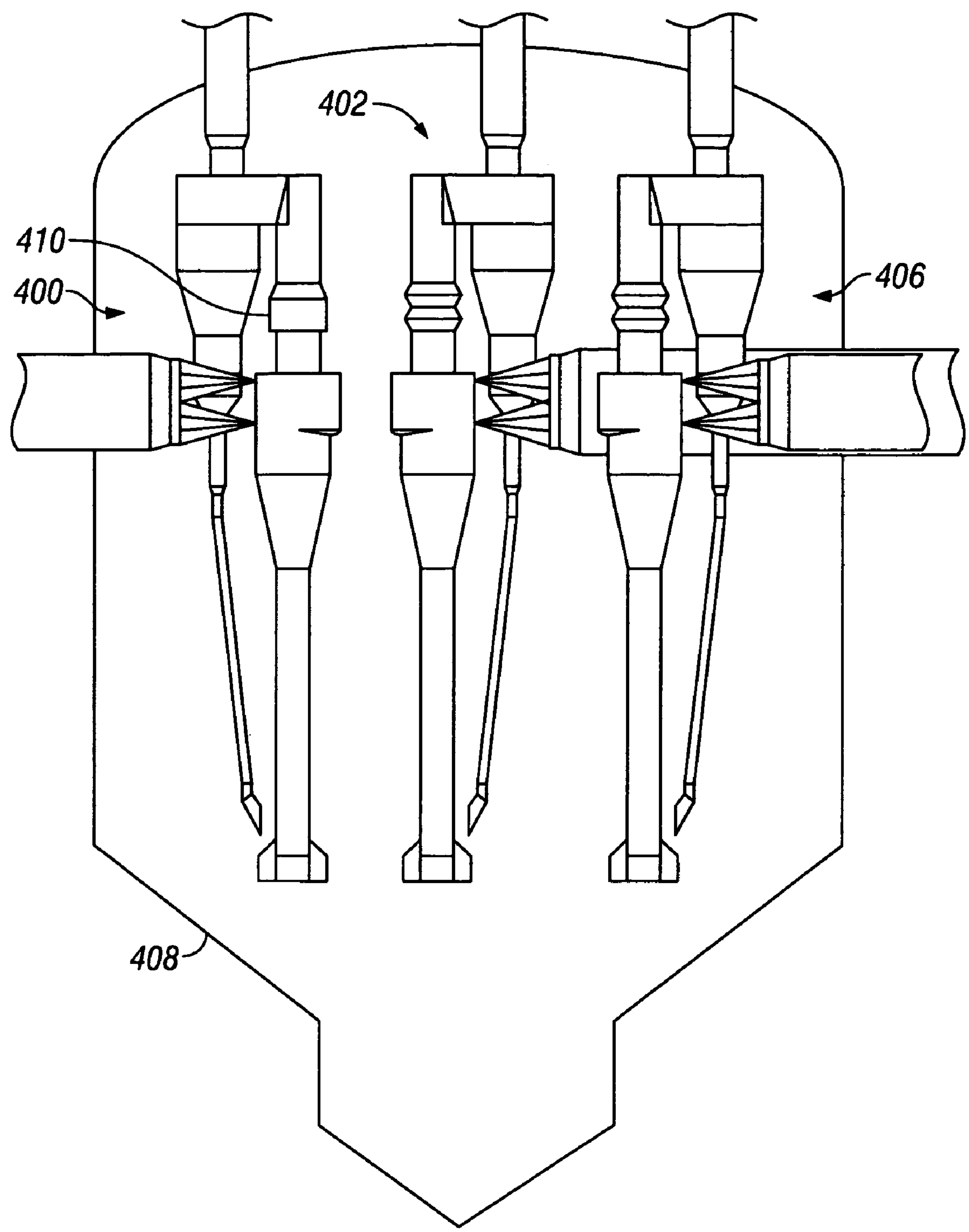
FIG. 4 schematically illustrates more than two cyclone systems within a disengager vessel, according to one embodiment.

FIG. 4 depicts a schematic illustration of three cyclone systems (400, 402, 406) within a disengager vessel 408, according to one embodiment of the invention. The three cyclone systems (400, 402, 406) can be equipped and/or operated similarly to the embodiment depicted in FIG. 1. First cyclone system 400 includes a vent 410 therein, which can be in communication with the disengager vessel 408. Second and third cyclone systems (402, 406) can be sealed to vapor entry from the disengager vessel 408 and/or sealed from discharging any vapor therein into the disengager vessel 408 to avoid cross-talk. Although two sealed cyclone systems (402, 406) are illustrated, any plurality of sealed cyclone systems can be present within disengager vessel 408.

Even though most of the embodiments are represented by two cyclone systems, with at least one example of three cyclone systems, the embodiments herein and the associated principles can be applied to systems that include multiple cyclones systems.

While these embodiments have been described with emphasis on the embodiments, it should be understood that within the scope of the appended claims, the embodiments might be practiced other than as specifically described herein.

What is claimed is:

1. A particle separation unit comprising:

a vessel;

a first cyclone system in direct communication with a riser disposed within the vessel;

a vent formed in the first cyclone system for vapor entry from the vessel; and a second cyclone system disposed within the vessel and sealed to restrict vapor entry from the vessel, wherein the first and second cyclone systems are independent.

2. The particle separation unit of claim 1 wherein the second cyclone system is further sealed from discharging any vapor therein into the vessel.

3. The particle separation unit of claim 1 further comprising a third cyclone system disposed within the vessel and sealed to restrict vapor entry from the vessel.

4. The particle separation unit of claim 3 further comprising a plurality of cyclone systems each disposed within the vessel and sealed each to restrict vapor entry from the vessel.

5. The particle separation unit of claim 4 wherein the each cyclone systems is independent.

6. A particle separation unit of a dual riser fluid catalytic cracking (FCC) unit comprising:

a first cyclone system in a disengager vessel comprising a first set of one or more cyclones in fluid communication between a first riser and a first fluid discharge from the disengager vessel;

a vent formed in the first cyclone system for vapor to enter from the disengager vessel and exit via the first fluid discharge; and a second cyclone system in the disengager vessel comprising a second set of one or more cyclones in fluid communication between a second riser and a second fluid discharge from the disengager vessel, wherein the second cyclone system is sealed to restrict vapor entry from the disengager vessel.

7. The particle separation unit of claim 6 further comprising a plurality of cyclone systems each disposed within the vessel and sealed each to restrict vapor entry from the vessel.

8. The particle separation unit of claim 6 wherein the second cyclone system comprises a sealed expansion joint.

9. The particle separation unit of claim 6 wherein the first cyclone system comprises primary and secondary cyclones.

10. The particle separation unit of claim 6 wherein the second cyclone system comprises primary and secondary cyclones.

11. The particle separation unit of claim 10 wherein the second cyclone system comprises a sealed expansion joint disposed in a conduit in communication between the primary and secondary cyclones.

12. The particle separation unit of claim 6 wherein the first set of one or more cyclones comprises a primary cyclone, the primary cyclone comprising:

a cyclone vessel;

a cylindrical surface centrally mounted in the primary cyclone to separate particles from a first riser effluent and form a vapor vortex of reduced solids content;

a sealed vapor outlet from the primary cyclone in communication with the vortex and the first fluid discharge;

a solids discharge outlet from a lower end of the primary cyclone; and wherein the vent comprises a plurality of openings in a wall of the lower end of the primary cyclone for the entry of vapor from the disengager vessel.

13. A particle separation unit of a dual riser fluid catalytic cracking (FCC) unit comprising:

a disengager vessel comprising a dense particle bed, a source of stripping fluid into the dense bed, and a dilute vapor phase above the dense bed;

a first cyclone system comprising a primary cyclone in fluid communication with a first riser to separate particles from a first riser effluent and discharge the separated particles to the dense bed, an outlet conduit from the primary cyclone to a secondary cyclone, and a first fluid discharge from the secondary cyclone through a wall of the disengager vessel;

a vent formed in the first cyclone system for vapor to enter from the dilute phase and exit via the first fluid discharge; and a second cyclone system comprising a primary cyclone in fluid communication with a second riser to separate particles from a second riser effluent and discharge the separated particles to the dense bed, an outlet conduit from the primary cyclone to a closed secondary cyclone, and a second fluid discharge from the secondary cyclone through a wall of the disengager vessel, wherein the second cyclone system is sealed to restrict vapor entry from the dilute phase.

14. A method of separating solid and vapor from riser effluent in a dual riser fluid catalytic cracking (FCC) unit comprising:

supplying effluent from first and second risers to primary cyclones of respective first and second cyclone systems in a disengager vessel to separate solids from the effluents;

discharging vapor from the first and second cyclone systems through respective first and second fluid discharges from the disengager vessel;

discharging solids from the primary cyclones of the first and second cyclone systems into a dense bed in the disengager vessel;

introducing stripping vapor into the dense bed to strip vapor from the solids into a dilute vapor phase in the disengager vessel;

venting vapor from the dilute vapor phase into the first cyclone system to exit the disengager vessel via the first fluid discharge; and sealing the second cyclone system to vapor entry from the dilute vapor phase.

15. The method of claim 14 wherein the venting is through an opening disposed in an outlet conduit from the primary cyclone in the first cyclone system.

16. The method of claim 15 wherein the outlet conduit is in communication between the primary cyclone in the first cyclone system and a secondary cyclone in the first cyclone system.

17. The method of claim 14 wherein the venting is through a plurality of openings in a wall of a lower end of the primary cyclone of the first cyclone system.

18. The method of claim 14 wherein the sealing comprises disposing a sealed expansion joint in an outlet conduit in fluid communication between the primary cyclone and a secondary cyclone in the second cyclone system.

19. A new particular separation unit comprising:

a vessel;

a first cyclone system in direct communication with a riser disposed within the vessel;

a vent formed in the first cyclone system for vapor entry from the vessel;

a second cyclone system disposed within the vessel and sealed to restrict vapor entry from the vessel; and at least a third cyclone system disposed within the vessel and sealed to restrict vapor entry from the vessel, wherein each cyclone system is independent.

* * * * *